(12) United States Patent
Shen et al.

(10) Patent No.: US 9,156,015 B2
(45) Date of Patent: Oct. 13, 2015

(54) MICROCHANNEL DOUBLE PIPE DEVICE AND USAGE THEREOF

(75) Inventors: Zhigang Shen, Beijing (CN); Jimmy Sunglai Yun, Singapore (SG); Jianfeng Chen, Beijing (CN); Guangwen Chu, Beijing (CN)

(73) Assignees: Beijing Univesity of Chemical Technology, Beijing (CN); Nanomaterials Technology PTE Ltd, Singapore, Singapore (SG)

( * ) Notice: Subject to any disclaimer, the term of this patent is extended or adjusted under 35 U.S.C. 154(b) by 925 days.

(21) Appl. No.: 13/263,833

(22) PCT Filed: Apr. 9, 2010

(86) PCT No.: PCT/CN2010/071651
§ 371 (c)(1),
(2), (4) Date: Oct. 10, 2011

(87) PCT Pub. No.: WO2010/115377
PCT Pub. Date: Oct. 14, 2010

(65) Prior Publication Data
US 2012/0037232 A1 Feb. 16, 2012

(30) Foreign Application Priority Data
Apr. 9, 2009 (CN) .......................... 2009 1 0131858

(51) Int. Cl.
*B01F 5/04* (2006.01)
*B01F 15/06* (2006.01)
(Continued)

(52) U.S. Cl.
CPC ........... *B01F 15/065* (2013.01); *B01F 11/0266* (2013.01); *B01F 13/0067* (2013.01);*B01F13/1027* (2013.01); *B01J 19/0093* (2013.01); *B01J 2219/00788* (2013.01); *B01J 2219/00889* (2013.01); *B22F 2998/00* (2013.01); *Y10T 137/0318* (2015.04)

(58) Field of Classification Search
CPC B01F 13/0067; B01F 15/065; B01J 19/0093; C10J 3/506
USPC .......... 137/602, 896; 239/106, 114, 115, 116, 239/398, 418, 423, 424, 425; 366/162.5, 366/177.1, 178.1
See application file for complete search history.

(56) References Cited

U.S. PATENT DOCUMENTS
4,283,255 A   8/1981   Ramshaw et al.
4,788,011 A   11/1988  Busse et al.
(Continued)

FOREIGN PATENT DOCUMENTS
CN      1116185 A    2/1996
CN      2221437 Y    3/1996
(Continued)

OTHER PUBLICATIONS
International Search Report, dated Jul. 15, 2010, corresponding to PCT/CN2010/071651, 6 pages.

*Primary Examiner* — John K Fristoe, Jr.
*Assistant Examiner* — Reinaldo Sanchez-Medina
(74) *Attorney, Agent, or Firm* — Christie, Parker & Hale, LLP (57) ABSTRACT

A microchannel double pipe device comprises a channel for inner nozzle (4), a channel for outer nozzle (5) and a mechanical probe (8). The channel for outer nozzle (5) concentrically surrounds the channel for inner nozzle (4), and the channel for inner nozzle (4) concentrically surrounds the mechanical probe (8). Constricted at the outlet of the channel for inner nozzle (4), the channel for inner nozzle (4) extends to form an inner nozzle core (9). Constricted at the outlet of the channel for outer nozzle (5), the channel for outer nozzle (5) extends to form an outer nozzle core (10). The outer nozzle core (10) essentially concentrically surrounds the inner nozzle core (9), and the outlets of the inner nozzle core (9) and the outer nozzle core (10) are at the same level essentially. The mechanical probe (8) is configured to intermittently empty the inner nozzle core (9). The device can be used for microcosmic mixing and reaction, especially suitable for continuous preparation of inorganic, organic or medicine particles with nanostructure or micron-structure using liquid-liquid precipitation method.

22 Claims, 3 Drawing Sheets

(51) Int. Cl.
　　　*B01F 11/02*　　　(2006.01)
　　　*B01F 13/00*　　　(2006.01)
　　　*B01F 13/10*　　　(2006.01)
　　　*B01J 19/00*　　　(2006.01)

(56) References Cited

U.S. PATENT DOCUMENTS 6,360,677 B1 * 3/2002 Robillard et al. ............. 110/260
7,506,822 B2 * 3/2009 Cairo et al. ........................ 239/1
2004/0251320 A1   12/2004 Koponen
2005/0152981 A1    7/2005 Gleeson et al.
2007/0210186 A1 *  9/2007 Fenton et al. ................. 239/422
2011/0306539 A1 * 12/2011 Shen et al. ..................... 514/1.1

FOREIGN PATENT DOCUMENTS

| CN | 2272332 Y | 1/1998 |
| CN | 1669631 A | 9/2005 |
| CN | 1871007 A | 11/2006 |
| CN | 101507908 A | 8/2009 |

* cited by examiner

MICROCHANNEL DOUBLE PIPE DEVICE
AND USAGE THEREOF

This application is a National Phase Patent Application and claims the priority of International Application Number PCT/CN2010/071651, filed on Apr. 9, 2010, which claims the benefit of priority to Chinese patent Application No. 200910131858.0, filed Apr. 9, 2009, to State Intellectual Property Office of China under the name "Microchannel double pipe device and usage thereof", the disclosure of which is incorporated by reference herein in its entirety.

FIELD OF THE INVENTION

The invention relates to a device with enhanced mixing, mass transfer, heat transfer and reaction, particularly to a microchannel double-pipe device (a tube-in-tube microchannel device) with enhanced mixing, mass transfer, heat transfer and reaction, and to the use thereof.

BACKGROUND OF THE INVENTION

Particles with nano- or micron-structure such as metal oxide, organic compound, inorganic compound and medicine particles are widely used in fields of microelectronics, information technology, space technology, chemical industry, machinery, automotive technology, pharmaceutical technology, etc. Methods for preparing particles with nano- or micron-structure are generally classified as physical or chemical, wherein precipitation method is the most common method among both physical and chemical methods. However, conventional precipitation methods usually employs a stirring tank as a reactor or precipitation device, which can not guarantee the rapid mixing, mass transfer and heat transfer of the reacting material, and result in the producing of heterogeneous particles after precipitation, long precipitation or reaction time and low production efficiency. The main reason of the above-mentioned problems is uneven microcosmic mixing in the reactor or precipitation device.

To address the above-mentioned problems with stirring tank, Jianfeng Chen et al. disclosed a method for preparing ultrafine calcium carbonate (Chinese Patent No. ZL95105343.4) by improving the rotating packed bed (also known as high-gravity reactor, Chinese Patent No. ZL95215430.7) and using it as a reactor to enhance the mixing and mass-transfer involved in the precipitation method, based on a process for effecting gas-liquid mass transfer using rotating packed bed disclosed by Ramshaw et al. (U.S. Pat. No. 4,283,255). In the method disclosed by Jianfeng Chen et al., the time required for carbonation is reduced and nano-sized particles with a particle size of 10-40 nm and an evenly distributed particle size are produced. However, the rotator in the high-gravity reactor usually takes the form of a packing layer, and during the precipitation and crystallization of the material with a high viscosity, blocking will occur and cleaning must be done constantly, therefore it is not suitable for continuous operation.

Therefore there is a need to provide a device with enhanced liquid-liquid microcosmic mixing and reaction, which can prepare inorganic, organic or medicine particles with nano- or micron-structure in a continuous manner.

SUMMARY OF THE INVENTION

In one aspect, the present invention provides a microchannel double-pipe device, comprising a channel for inner nozzle (4), a channel for outer nozzle (5) and a mechanical probe (8), wherein the channel for outer nozzle (5) concentrically surrounds the channel for inner nozzle (4) substantially, and the channel for inner nozzle (4) concentrically surrounds the mechanical probe (8) substantially, and constricted at the outlet of the channel for inner nozzle (4), the channel for inner nozzle (4) extends to form an inner nozzle core (9), constricted at the outlet of the channel for outer nozzle (5), the channel for outer nozzle (5) extends to form an outer nozzle core (10), the outer nozzle core (10) concentrically surrounds the inner nozzle core (9) substantially, and the mechanical probe (8) is configured to intermittently empty (purge) the inner nozzle core (9).

According to embodiments of the microchannel double-pipe device of the present invention, the mechanical probe (8) has a hollow structure to allow high-pressure gas intermittently enter and empty the inner nozzle core (9) through the mechanical probe (8).

According to embodiments of the microchannel double-pipe device of the present invention, the mechanical probe (8) has a solid structure and is configured to intermittently enter and empty the inner nozzle core (9).

According to embodiments of the microchannel double-pipe device of the present invention, the mechanical probe (8) empties the inner nozzle core (9) with a frequency of 1-200 times/min.

According to embodiments of the microchannel double-pipe device of the present invention, the outlet of the inner nozzle core (9) is substantially flush with the outlet of the outer nozzle core (10), or the outlet of the inner nozzle core (9) is located inward from the outlet of the outer nozzle core (10).

According to embodiments of the microchannel double-pipe device of the present invention, the microchannel double-pipe device further comprises a jacket surrounding the channel for outer nozzle (5) for temperature controlling.

According to embodiments of the microchannel double-pipe device of the present invention, the microchannel double-pipe device further comprises a collector (11) surrounding the outlets of the outer nozzle core (10) and the inner nozzle core (9).

According to embodiments of the microchannel double-pipe device of the present invention, the microchannel double-pipe device further comprises an ultrasonic device mounted on the outer surface of the lower part of the collector (11) to prevent the agglutination of the particles and/or break up the particle aggregates in the collector (11).

According to embodiments of the microchannel double-pipe device of the present invention, the cross-section of the channel of the inner nozzle core (9) is a circle, square or equilateral triangle, the diameter of the circle or each side length of the square or equilateral triangle is 0.01-5 mm, the interval between the inner nozzle core (9) and the outer nozzle core (10) is 0.01-5 mm.

According to embodiments of the microchannel double-pipe device of the present invention, the two fluids passing through the outlets of the inner nozzle core (9) and the outer nozzle core (10) each independently have a flow rate of 0.01-50 m/s, a volume flow of 0.01-500 L/min and a Reynolds number of 1,000-100,000.

In another aspect, the present invention also provides a microchannel double-pipe device which consists of several microchannel double-pipe devices described above connected in parallel.

In another aspect, the present invention also provides the use of any one of the microchannel double-pipe devices described above in the preparation of the inorganic, organic or medicine particles with a nano- or micron-structure using a liquid-liquid system.

According to the use of the microchannel double-pipe devices of the present invention, metal oxide nanoparticles are prepared by liquid-liquid precipitation method, in which a metal ion salt solution is added into the channel for inner nozzle (4) and a precipitant solution is added into the channel for outer nozzle (5), the metal ion salt solution and the precipitant solution mix and react after passing through the outlets of the inner nozzle core (9) and the outer nozzle core (10) to form a suspension, and optionally drying the suspension to form metal oxide nanoparticle products in powder form.

According to the use of the microchannel double-pipe devices of the present invention, medicine particles are prepared by liquid-liquid precipitation method, in which a medicine-containing solution is added into the channel for inner nozzle (4) and a anti-solvent solution miscible with the medicine-containing solution is added into the channel for outer nozzle (5), the medicine-containing solution and the anti-solvent solution mix and react after passing through the outlets of the inner nozzle core (9) and the outer nozzle core (10) to form a suspension, and optionally the medicine particles product in powder form is obtained after drying the suspension.

According to the use of the microchannel double-pipe devices of the present invention, one or more of additives are added to the suspension.

According to the use of the microchannel double-pipe devices of the present invention, the drying is online spray drying and online freeze drying.

According to the use of the microchannel double-pipe devices of the present invention, the medicine is selected from the group consisted of: analgesics, anti-inflammatory drugs, anti-anginal drugs, anti-arrhythmic drugs, antibiotics, anti-parasitics, anti-clotting drugs, antidepressants, anti-diabetic drugs, Antifungal agents, antihistamines, anti-hypertensive drugs, anti-muscarinic drugs, anti-wart drugs, anti-migraine drugs, antiparasitics, anti-Parkinson drugs, antipsychotics, hypnotics, sedatives, anti-stroke drugs, anti-thrombotic drugs, antitussives, antiviral drugs, beta-adrenergic receptor blockers, calcium channel blockers, vasoconstrictors, contraceptives, cortical steroids, dermatology drugs, disinfectants, diuretics, gastrointestinal drugs, systemic anesthetics, hemostatics, local anesthetics, opioid analgesics, parasympathomimetics, peptides, hormones, steroids, inducers, vasodilator, nitric oxide agents, acid, base, salt derivatives and spatial isomerism derivatives suitable for a preparation.

According to the use of the microchannel double-pipe devices of the present invention, the medicine is selected from the group consisted of: Fenofibrate, cefuroxime axetil, azithromycin, lopinavir, cyclosporine, bicalutamide, megestrol acetate, levodopa, ciprofloxacin, camptothecin, danazol, naproxen, silybin, itraconazole and roxithromycin.

According to the use of the microchannel double-pipe devices of the present invention, the additive is selected from the group consisted of: filling agents, diluents, adhesives, lubricants and disintegrating agents.

In another aspect, an object of the present invention is providing a microchannel double-pipe device with enhanced mixing, mass transfer, heat transfer and reaction.

In an embodiment of the present invention, the microchannel double-pipe device comprises a first feed pipe, a second feed pipe, an inner nozzle, an outer nozzle, a jacket for temperature controlling and a collector; wherein the inner nozzle is composed of a fluid channel for the inner nozzle and a inner nozzle core, the inner nozzle is a first microchannel for carrying raw material liquid flow; the outer nozzle is composed of a fluid channel for the outer nozzle and a outer nozzle core, the outer nozzle is a second microchannel for carrying raw material liquid flow; the nozzle core of the outer nozzle matches with and surrounds the nozzle core of the inner nozzle, the inner and outer nozzles together form a double-pipe structure (a tube-in-tube structure); the jacket is disposed on the outer surface of the outer nozzle to control the temperature of the whole device and the two material flow before and after mixing; a collector is located at the lower part of the device, one of the two different liquid material flow passes through the first feed pipe, the fluid channel for the inner nozzle and the inner nozzle core, while the other liquid material flow passes through the second feed pipe, the fluid channel for the outer nozzle and the outer nozzle core, wherein the two liquid material flows microscopically mixed rapidly, and the resulting material flow is captured, buffered and further mixed by the collector.

In an embodiment of the present invention, the cross-section of the channel of the inner nozzle core is a circle, square or equilateral triangle, the diameter of the circle or each side length of the square or equilateral triangle is 0.01-5 mm, the interval between the inner nozzle core and the outer nozzle core is 0.01-5 mm.

The fluids passing through the outlets of the inner and the outer nozzle cores normally have a flow rate of 0.01-50 m/s, a volume flow of 0.01-500 L/min and a Reynolds number of 1,000-100,000.

In a preferred embodiment of the present invention, the structure of the collector is a circular cone.

The medium in the jacket can be selected according to the requirement for a particular process.

In another aspect, an object of the present invention is providing a microchannel double-pipe device with enhanced mixing, mass transfer, heat transfer and reaction which can be operated in a continuous manner.

In an embodiment of the present invention, the above-mentioned device further comprises a mechanical probe which can effectively prevent the particulate from being accumulated on the nozzle core or remove the particulate from the nozzle core, so as to make sure the microchannel in the device is always unobstructed, thereby achieving the object of preparing the particles with nano- or micron-structure in a continuous manner.

In an embodiment of the present invention, the mechanical probe in the device has a hollow structure. If desirable, high-pressure nitrogen passes through the hollow structure to purge the nozzle core, so as to effectively prevent the particulate from being accumulated on the nozzle core or remove the particulate from the nozzle core to avoid the obstruct of the nozzle core. In another particular embodiment, the mechanical probe in the device has a solid structure. In this case, the probe purges the nozzle core by going downwards through the nozzle core. The purging of the nozzle core can be carried out at a suitable rate by the mechanical probe, usually at 1-200 times/min.

The operation mechanism of the mechanical probe is: as for the mechanical probe with a solid structure, a spring device is mounted on the top of the mechanical probe as a controlling part, and is communicated with a gas passage, the gas passage is communicated with high-pressure nitrogen source, and a gas valve is disposed on the gas passage, that is, between the spring device and the high-pressure nitrogen source. The open and close of the valve can be controlled through a computer program, and the time of the open and the close can also be controlled by a computer program automatically. When the program is set and the power is on, the gas valve opens and the mechanical probe can go downwards under a high pressure to purge the nozzle core, so as to prevent the particulate from being accumulated on the nozzle core or remove the particulate from the nozzle core. When the gas valve is closed, the high pressure goes disappears and the mechanical probe returns to its original position due to the effect of the spring. Thus the mechanical probe can purge the nozzle core at a determined time to make sure the entire device operates continuously. As for the mechanical probe with a hollow structure, the top of the probe with a hollow structure is communicated with a gas passage, the gas passage is communicated with high-pressure nitrogen source, and a gas valve is disposed on the gas passage, that is, between the mechanical probe and the high-pressure nitrogen source. The open and close of the valve can be controlled through a computer program, and the time of the open and the close can also be controlled by a computer program automatically. When the program is set and the power is on, the gas valve opens and the high-pressure nitrogen passes through the hollow structure to purge the nozzle core promptly, so as to prevent the particulate from being accumulated on the nozzle core or remove the particulate from the nozzle core, thus the object of purging the nozzle at a determined time and making sure the entire device operates continuously is achieved. In an embodiment, an ultrasonic device is mounted on the outer surface of the lower part of the circular cone collector to prevent the agglutination of the particles and break up the particle aggregates in the collector.

In an embodiment of the present invention, the material flow collected in the collector is subjected to further post-treatment process to obtain a product with nano- or micron-structure in powder form. The post-treatment process includes but not limited to filtration and drying, In another aspect, the present invention provides a method for operating the microchannel double-pipe device.

On another aspect, the present invention provides a method for preparing inorganic, organic or medicine particles with nano- or micron structure in a continuous manner.

The advantages of the microcosmic mixing in the microchannel and the reaction device are that: by replacing devices of prior art like a stirring tank, the microchannel double-pipe device can effectively enhance the liquid-liquid microcosmic mixing and the subsequent reaction, therefore the particle produced during precipitation has an uniform size; particularly, the mechanical probe is further arranged to prevent the particulate from being accumulated on the nozzle core or remove the particulate from the nozzle core, to make sure the microchannel is always opened up and the ultrasonic device is arranged to prevent the agglutination of the particles and break up the particle aggregates, thereby the object of continuously production is achieved.

BRIEF DESCRIPTION OF DRAWINGS

The other features, objects and advantages of the present invention will become more apparent by referring to the detailed description of the non-restrictive examples with the following drawings.

In the drawings: 1. the controlling part of the mechanical probe, 2. the first feed pipe, 3. the second feed pipe, 4. the channel for inner nozzle, 5. the channel for outer nozzle, 6. jacket for temperature controlling, 7. the medium inlet of the jacket, 8. mechanical probe, 9. inner nozzle core, 10. outer nozzle core, 11. circular cone collector, 12. the medium outlet of the jacket, 13. ultrasonic device.

DETAILED DESCRIPTION

The following are the description and illustration of the exemplary embodiments of the present invention. These embodiments are included in the microchannel double-pipe device and the method of using such microchannel double-pipe device, more particularly, in the method for preparing the inorganic, organic or medicine particles with nano- or micron-structure in a continuous manner. It is apparent to those skilled in the art that the preferred embodiments discussed below are exemplary and can be modified without departing from the scope and the sprit of the present invention. However, the exemplary embodiments discussed below can include preferred steps, methods and features for clarity and accuracy, those skilled in the art should understand that these preferred steps, methods and features are not essential for determining the scope of the present invention.

The microchannel double-pipe device of the present invention and the method for preparing particles with nano- or micron-structure are based on the inventor's knowledge and study in art related fields.

For producing the particles with nano- or micron-structure by using liquid-phase precipitation method, the formation of the particles with nano- or micron-structure is first a phase transition process which includes nucleation stage and growth stage. When two solutions that can form precipitate quickly are mixed, diffusion and phase transition will occur at the interface between the two fresh solutions. If the concentration of the resulting new phase exceeds a critical nucleation concentration, numerous new nucleus will be produced; in the mean while nucleation leads to the concentration decrease of the two solutions to a value at which it is not sufficient for new nucleus formation but the growth of the formed nucleus can be maintained. Therefore, when producing particles with nano- or micron-structure by using liquid-liquid precipitation method, it is advantage to provide phase interface between fresh solutions as much as possible when two liquid phases are mixed, thereby the number of the resulting primary nucleus is larger and the concentration for the subsequence growth of the nucleus is lower, which thus can provide a condition at which the time for nucleus growth and the particle size decrease. The above effects can be achieved by enhancing microcosmic mixing and mass transfer. The present invention is based on above theory and principle.

Figure 1:
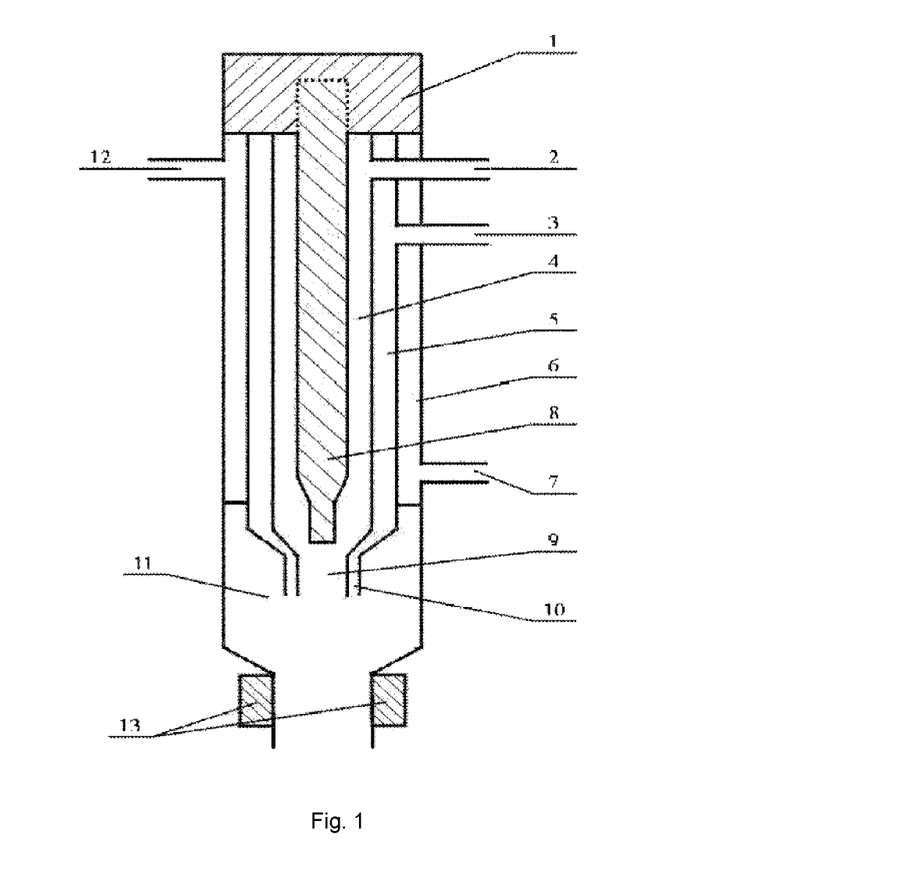
FIG. 1 is the longitudinal section schematic diagram of an embodiment of a preferred microchannel double-pipe device according to the present invention.

Hereinafter, embodiments of the present invention will be described in detail with reference to FIGS. 1 and 2.

In practice, liquid flow a is quickly added to the channel of inner nozzle 4 through the first feed pipe 2, then, the flow rate of the liquid flow a is increased at inner nozzle core 9 due to the narrowing of the channel. Liquid flow b is quickly added to the channel of outer nozzle 5 through the second feed pipe 3, then, the flow rate of the liquid flow b is increased at outer nozzle core 10 due to the narrowing of the channel. Two flows collided each other and mixed at the outlets of the nozzle cores and a micro-liquid flow with high flow rate is generated, microcosmic mixing is achieved and precipitation takes place, finally the flow is collected in the circular cone collector 11, then the resulting flow is drained out.

In the above-mentioned embodiment, the cross-section of channel of the inner nozzle core 9 can have various shapes including but not limited to a circle, square or equilateral triangle. The diameter of the circle is 0.01-5 mm; each side of the square or equilateral triangle is 0.01-5 mm. The shape of the channel of the outer nozzle core corresponds to that of the inner nozzle core and the interval between the inner nozzle core and the outer nozzle core is 0.01-5 mm. The outer nozzle core surrounds and matches with the inner nozzle core, therefore the fluid generated after the prompt microcosmic mixing between the fluids from the inner and outer nozzle core maintains the main direction of the feed flow in the first microchannel.

To achieve the purpose of prompt microcosmic mixing, the fluids passing through the outlets of the inner nozzle core 9 and the outer nozzle core 10 have a flow rate (v) of 0.01-50 m/s, a volume flow (Q) of 0.01-500 L/min and a Reynolds number (Re) of 1,000-100,000. wherein Re=$\rho$vL/$\mu$, $\rho$, $\mu$ and v are the density, viscosity and flow rate of the fluid respectively, L is the diameter or equivalent diameter of the cross-section of the microchannel.

In some embodiments of the present invention, the outlets of the inner nozzle core (9) is substantially flush with the outer nozzle core (10) or the outlet of the inner nozzle core (9) is located inward from the outlet of the outer nozzle core (10), so as to achieve a prompt microcosmic mixing more efficiently.

The device comprise a mechanical probe 8 to effectively prevent the particulate generated by mixing and precipitation from being accumulated on the nozzle core or remove the particulate from the nozzle core, so as to make sure the microchannel double-pipe device is operated normally in a continuous manner.

Figure 3:
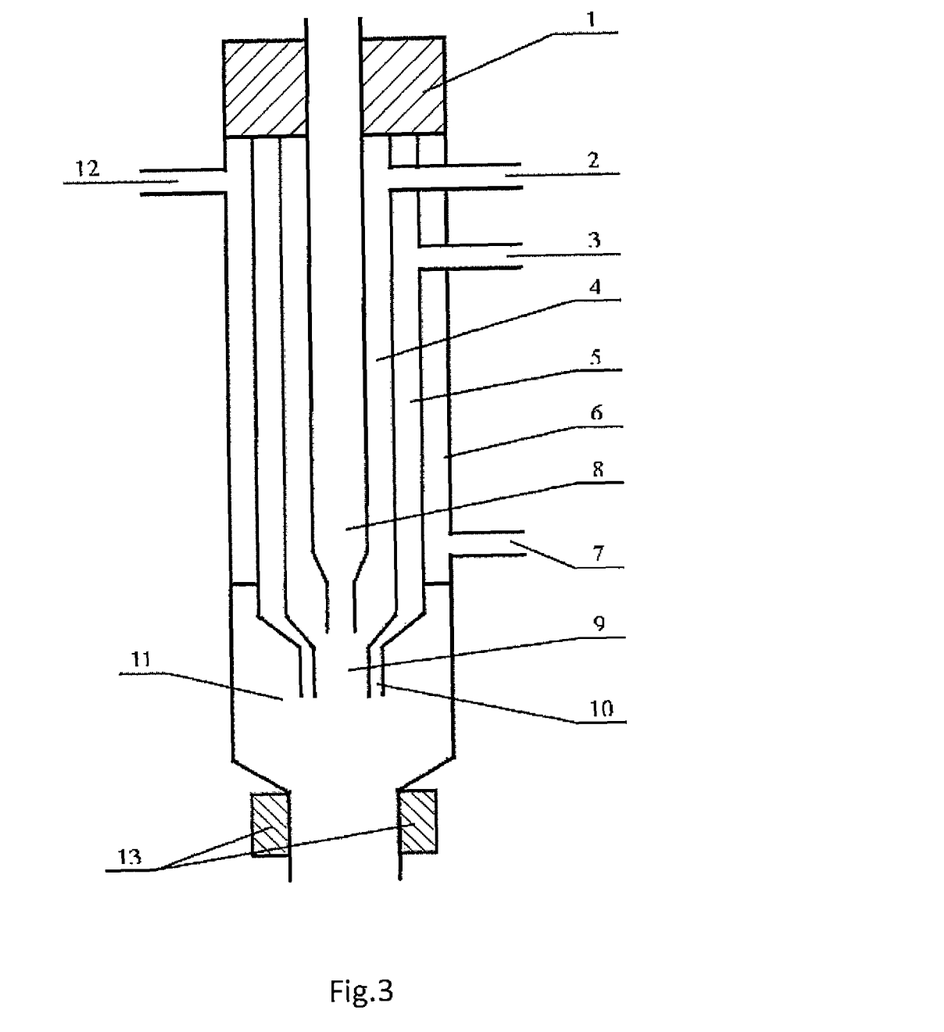
FIG. 3 is the longitudinal section diagram of an embodiment having a mechanical probe with a hollow structure.

The mechanical probe can have a solid structure or a hollow structure. In the case of the hollow structure, high-pressure nitrogen passes through the hollow structure to purge the nozzle core if desirable, so as to maintain the normal operation of the nozzle core. In the case of the solid core, the mechanical probe 8 purges the nozzle core by going downwards through the nozzle core at a determined time. The purging of the nozzle core can be carried out at a suitable rate by the mechanical probe, usually at 1-200 times/min. To prevent the agglutination of the particles precipitated after mixing the flows from inner and outer nozzle or to reduce the particle aggregates, an ultrasonic device 13 is mounted on the outer surface of the lower part of the circular cone collector 11 to disperse the collected suspension and prevent it from agglutination.

Figure 2:
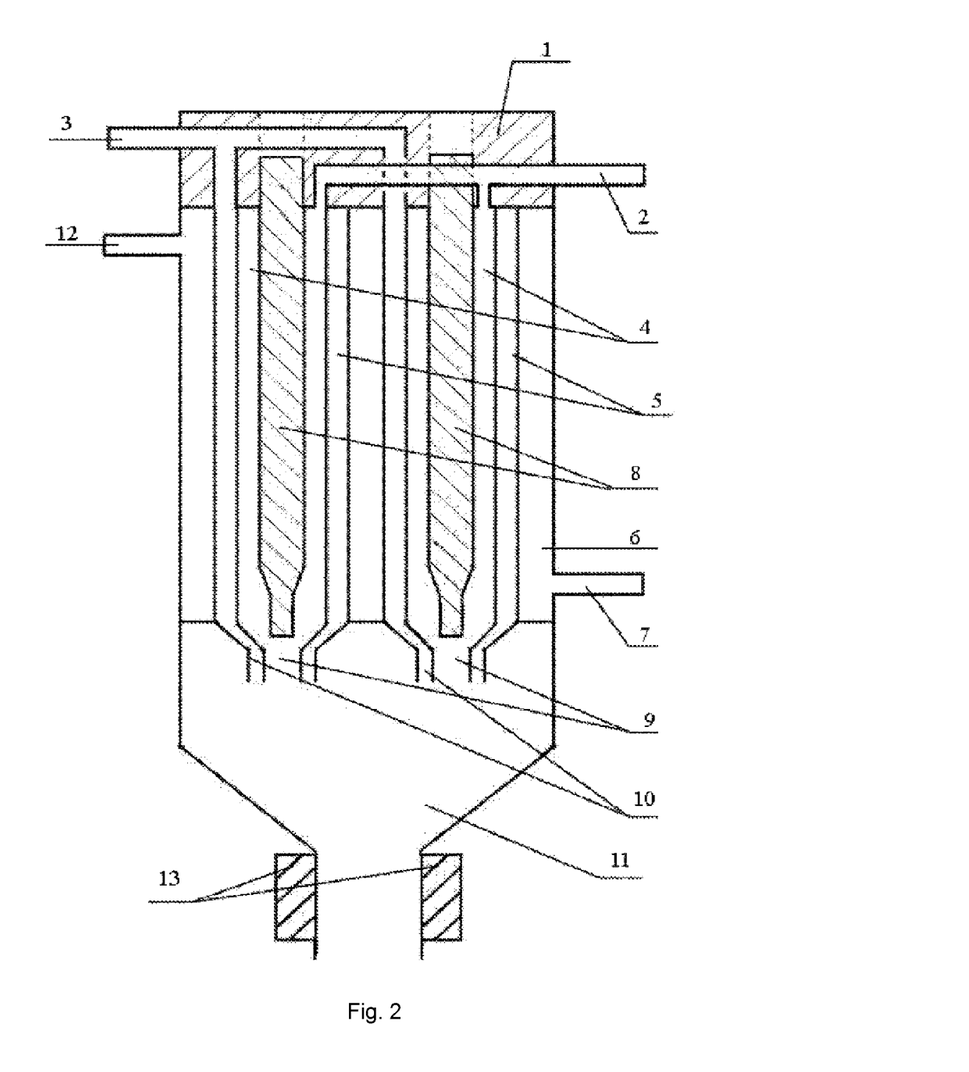
FIG. 2 is the longitudinal section schematic diagram of an embodiment with a plurality of microchannel double-pipe devices according to the present invention.

In an embodiment, a plurality of microchannel double-pipe devices can be in parallel connection as illustrated in FIG. 2, so as to be used in industrial implementation and achieve a homogeneous and microcosmic mixing between the raw materials such as liquid a and liquid b.

In an embodiment, liquid a and liquid b of the present invention can react to form precipitate after mixing.

For example, liquid a can be a metal salt solution, liquid b can be a precipitant solution.

The metal salt solution can be a solution of metal acetate, metal chloride, metal nitrate, metal phosphate, metal sulfate or metal carbonate, or a mixture thereof.

The precipitant solution can be alkali solution, for example, inorganic alkali solution such as sodium hydroxide, potassium hydroxide or ammonium hydroxide, or organic alkali solution such as tetramethyl ammonium hydroxide, or a mixture thereof.

In a particular embodiment, liquid a is a mixture solution of BaCl2 and TiCl4, liquid b is NaOH solution. The molar ratio of Ba/Ti in liquid a is 1.05, the concentration of $Ti^{4+}$ in liquid a is 0.5 mol/L. The concentration of OH— in liquid b is 3.0 mol/L. The ratio of the volume flows of liquid a and liquid b in the respective feed pipe is 1:1, both has a volume flow of 20 L/h and a flow rate of 2 m/s. The temperature of the reaction is controlled at 90° C. by the temperature controlling jacket. The two liquids are combined and reacted in the circular cone collector 11, and resulting suspension is drained, and filtered and dried to obtain $BaTiO_3$ nano-particle product in powder form. The particle size of the BaTiO3 particle is 30±10 nm as determined by Transmission Electron Microscope (TEM).

In an embodiment, liquid a is medicine solution and liquid b is anti-solvent.

Anti-solvent solution refers to a solution that the solvent therein is miscible with the solvent of the medicine solution, but the medicine solution has low or little solubility in the anti-solvent solution. Therefore precipitation takes place after the mixing of the medicine solution and the anti-solvent solution duo to the change in solubility.

The medicine is selected from the group consisted of: analgesics, anti-inflammatory drugs, Anti-anginal drugs, anti-arrhythmic drugs, antibiotics, antiparasitics, anti-clotting drugs, antidepressants, anti-diabetic drugs, Antifungal agents, antihistamines, anti-hypertensive drugs, anti-muscarinic drugs, anti-wart drugs, anti-migraine drugs, antiparasitics, anti-Parkinson drugs, antipsychotics, hypnotics, sedatives, anti-stroke drugs, anti-thrombotic drugs, antitussives, antiviral drugs, beta-adrenergic receptor blockers, calcium channel blockers, vasoconstrictors, contraceptives, cortical steroids, dermatology drugs, disinfectants, diuretics, gastrointestinal drugs, systemic anesthetics, hemostatics, local anesthetics, opioid analgesics, parasympathomimetics, peptides, hormones, steroids, inducers, vasodilator, nitric oxide agents, acid, base, salt derivatives and spatial isomerism derivatives suitable for a preparation.

In an embodiment, the medicine from liquid a is selected from the group consisted of: Fenofibrate, cefuroxime axetil, azithromycin, lopinavir, cyclosporine, bicalutamide, megestrol acetate, levodopa, ciprofloxacin, camptothecin, danazol, naproxen, silybin, and itraconazole.

In an embodiment, the solvent of the medicine solution a is one of methanol, ethanol, acetone, propanol, isopropanol or the mixture thereof.

In an embodiment, the anti-solvent in the anti-solvent solution is water.

In an embodiment, one or more of additives are added to medicine solution a, anti-solvent solution b or the suspension formed after the microcosmic mixing in microchannel double-pipe device.

In an embodiment, the one or more of additives added to medicine solution a, anti-solvent solution b or the suspension formed after the microcosmic mixing in microchannel double-pipe device are selected from filling agents (diluents), adhesives, lubricants and disintegrating agents etc.

In an embodiment, the one or more of additives added to medicine solution a, anti-solvent solution b or the suspension formed after the microcosmic mixing in microchannel double-pipe device are selected from lactose, microcrystalline cellulose, mannitol, dextrin, hydroxypropyl methyl cellulose, povidone, crosslinked sodium carboxymethyl cellulose, cross-linked povidone, polyvinyl alcohol, magnesium lauryl sulfate and sodium lauryl sulfate etc.

In a particular embodiment, the medicine solution a is obtained by dissolving fenofibrate 20 g and sodium lauryl sulfate 0.5 g in 200 ml ethanol. Before added into the feed pipe I (2), the temperature of the medicine solution a is maintained at 35° C. The anti-solvent solution b is obtained by dissolving lactose 76 g, hydroxypropyl methyl cellulose- E3 2 g and sodium lauryl sulfate 1.5 g in 2 L water. Before added into the feed pipe II (3), the temperature of the anti-solvent solution b is maintained at 4° C. The ratio of the volume flows of medicine solution a and anti-solvent solution b in the respective feed pipe is 1:1. The volume flow of the fenofibrate solution in the feed pipe I (2) is 2 L/hr. The flow rate of the fenofibrate solution in the feed pipe I (2) is 1 m/s. The two solutions are combined and reacted in the circular cone collector 11, and the resulting suspension is flowed out and dried by online spray drying to obtain a powder containing fenofibrate nano-particles and additives. The particle size of the fenofibrate particles in the powder is 30±10 nm as determined by TEM. The fenofibrate particles in the powder are well-dispersed in the additives. The final fenofibrate powder can be used in make a preparation and improved the bioavailability of the fenofibrate preparation.

What is claimed is:

1. A method for preparation of inorganic, organic or medicine particles with nano- or micron-structure using a liquid-liquid system, in which a microchannel double-pipe device is used,
wherein the microchannel double-pipe device comprises a channel for inner nozzle, a channel for outer nozzle and a mechanical probe, wherein the channel for outer nozzle surrounds the channel for inner nozzle, the channel for inner nozzle surrounds the mechanical probe; and constricted at the outlet of the channel for inner nozzle, the channel for inner nozzle extends to form an inner nozzle core; constricted at the outlet of the channel for outer nozzle, the channel for outer nozzle extends to form an outer nozzle core; the outer nozzle core surrounds the inner nozzle core, and the mechanical probe is configured to intermittently purge the inner nozzle core; and
wherein a liquid (a) is added into the channel for inner nozzle and a liquid (b) is added into the channel for outer nozzle, the liquid (a) and the liquid (b) collide each other and mix at the outlet of the inner nozzle core and the outlet of the outer nozzle core.

2. The method according to claim 1, wherein metal oxide nanoparticles are prepared by liquid-liquid precipitation method, in which the liquid (a) is a metal ion salt solution which is added into the channel for inner nozzle, and the liquid (b) is a precipitant solution which is added into the channel for outer nozzle, the metal ion salt solution and the precipitant solution mix and react after passing through the outlets of the inner nozzle core and the outer nozzle core to form a suspension, and optionally drying the suspension to form metal oxide nano-particle products in powder form.

3. The method according to claim 2, wherein one or more of additives are added to the suspension.

4. The method according to claim 3, wherein the additive is selected from the group consisted of filling agents, diluents, adhesives, lubricants and disintegrating agents.

5. The method according to claim 2, wherein the drying is online spray drying and online freeze drying.

6. The method according to claim 2, wherein the metal ion salt solution is a solution of metal acetate, metal chloride, metal nitrate, metal phosphate, metal sulfate, metal carbonate, or a mixture thereof.

7. The method according to claim 2, wherein the precipitation solution is an inorganic alkali solution, an organic alkali solution, or a mixture thereof.

8. The method according to claim 1, wherein medicine particles are prepared by liquid-liquid precipitation method, in which the liquid (a) is a medicine-containing solution which is added into the channel for inner nozzle and the liquid (b) is an anti-solvent solution miscible with the medicine-containing solution which is added into the channel for outer nozzle, the medicine-containing solution and the anti-solvent solution mix and react after passing through the outlets of the inner nozzle core and the outer nozzle core to form a suspension, and optionally drying the suspension to form medicine particle products in powder form.

9. The method according to claim 8, wherein one or more of additives are added to the suspension.

10. The method according to claim 9, wherein the additive is selected from the group consisted of: filling agents, diluents, adhesives, lubricants and disintegrating agents.

11. The method according to claim 8, wherein the drying is online spray drying and online freeze drying.

12. The method according to claim 8, wherein the medicine is selected from the group consisted of analgesics, anti-inflammatory drugs, Anti-anginal drugs, anti-arrhythmic drugs, antibiotics, antiparasitics, anti-clotting drugs, antidepressants, anti-diabetic drugs, Antifungal agents, antihistamines, anti-hypertensive drugs, anti-muscarinic drugs, anti-wart drugs, anti-migraine drugs, antiparasitics, anti-Parkinson drugs, antipsychotics, hypnotics, sedatives, anti-stroke drugs, anti-thrombotic drugs, antitussives, antiviral drugs, beta-adrenergic receptor blockers, calcium channel blockers, vasoconstrictors, contraceptives, cortical steroids, dermatology drugs, disinfectants, diuretics, gastrointestinal drugs, systemic anesthetics, hemostatics, local anesthetics, opioid analgesics, parasympathomimetics, peptides, hormones, steroids, inducers, vasodilator, nitric oxide agents, acid, base, salt derivatives and spatial isomerism derivatives suitable for a preparation.

13. The method according to claim 8, wherein the medicine is selected from the group consisted of: Fenofibrate, cefuroxime axetil, azithromycin, lopinavir, cyclosporine, bicalutamide, megestrol acetate, levodopa, ciprofloxacin, camptothecin, danazol, naproxen, silybin, itraconazole and roxithromycin.

14. The method according to claim 1, further comprises a collector surrounding the outlets of the outer nozzle core and the inner nozzle core.

15. The method according to claim 14, further comprises an ultrasonic device, which is mounted on the outer surface of the lower part of the collector to prevent the agglutination of the particles and/or break up the particle aggregates in the collector.

16. The method according to claim 1, wherein the mechanical probe has a hollow structure, so as to allow high-pressure gas to intermittently pass through the mechanical probe and purge the inner nozzle core.

17. The method according to claim 1, wherein the mechanical probe has a solid structure, and is configured to intermittently enter into and purge the inner nozzle core.

18. The method according to claim 1, wherein the mechanical probe purges the inner nozzle core with a frequency of 1-200 times/min.

19. The method according to claim 1, further comprises a jacket for temperature controlling, which is surrounding the outer surface of the channel for outer nozzle.

20. The method according to claim 1, wherein the cross-section of the channel of the inner nozzle core is a circle, square or equilateral triangle, the diameter of the circle or each side length of the square or equilateral triangle is 0.01-5 mm, the interval between the inner nozzle core and the outer nozzle core is 0.01-5 mm.

21. The method according to claim 1, wherein the liquids (a) and (b) passing through the outlets of the inner nozzle core and the outer nozzle core each independently have a flow rate of 0.01-50 m/s, a volume flow of 0.01-500 L/min and a Reynolds number of 1,000-100,000.

22. The method according to claim 1, wherein two or more of the microchannel double-pipe device in parallel connection are used.

\* \* \* \* \*